Patented Feb. 3, 1925.

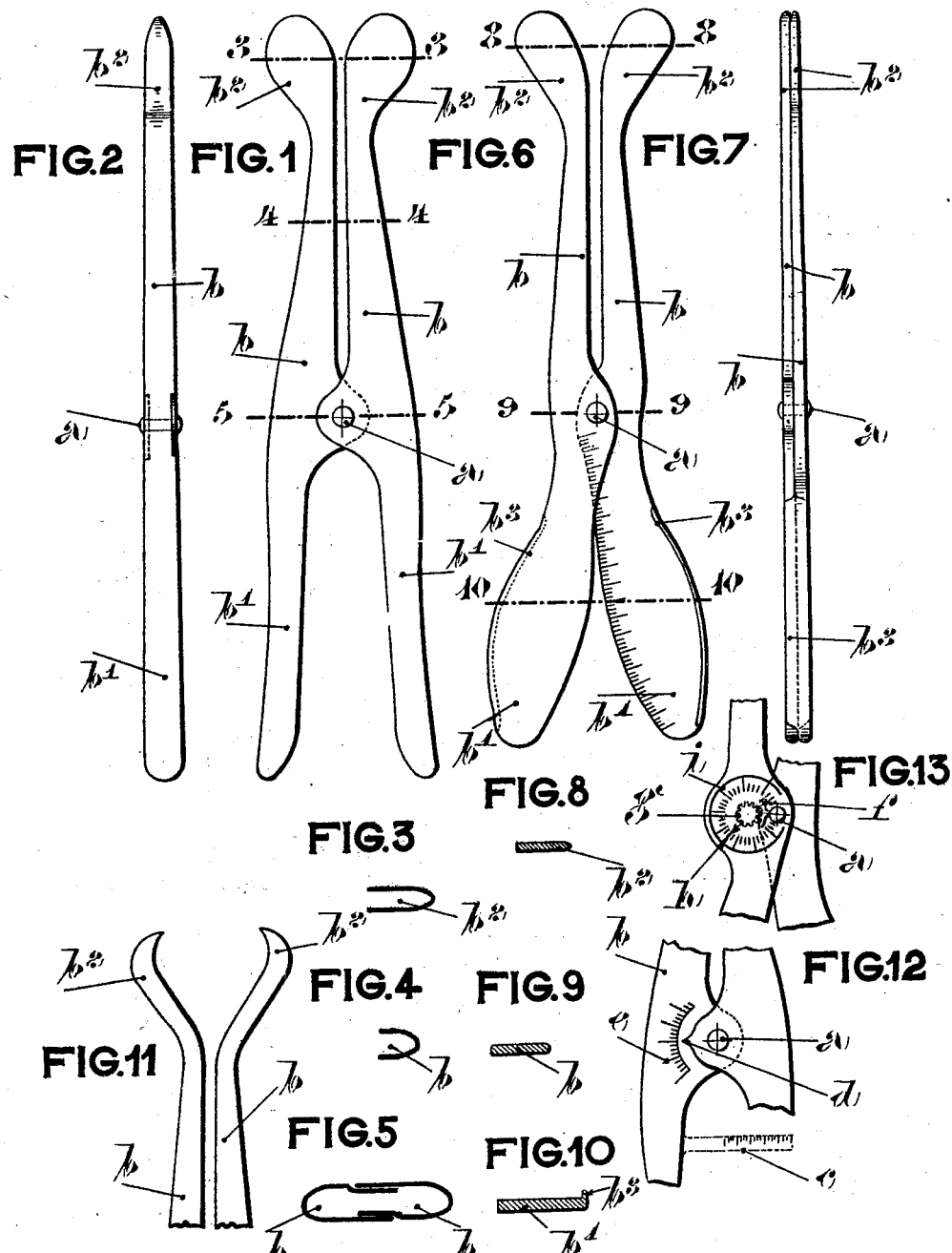

1,525,218

UNITED STATES PATENT OFFICE.

PIERRE BARBIER, OF GRENOBLE, FRANCE.

DEVICE FOR MEASURING GLOVES.

Application filed March 15, 1922. Serial No. 543,931.

*To all whom it may concern:*

Be it known that I, PIERRE BARBIER, a citizen of the French Republic, residing at Grenoble, Isere, France, have invented certain new and useful Improvements in Devices for Measuring Gloves, of which the following is a specification.

This invention relates to a device for measuring gloves.

Hitherto it was found sufficient for the purpose of taking the measurement of gloves to draw them on by hand; the size was thus approximately ascertained. Such a method however, requires a certain amount of practice from the operator and in any case does not give an exact result.

The object of this invention is to remedy this drawback by means of device in the form of calipers of which different forms of construction are shown by way of example in the accompanying drawing wherein—

Fig. 1 is a front view and Fig. 2 a side view of metallic calipers constructed according to the invention.

Figs. 3, 4 and 5 are sections along lines 3—3, 4—4 and 5—5 of Fig. 1 showing the outline of the branches at different points.

Fig. 6 is a front view and Fig. 7 a side view of calipers in cast metal.

Figs. 8, 9 and 10 are views in section respectively on lines 8—8, 9—9 and 10—10 of Fig. 6.

Fig. 11 illustrates one of the variations of the small tongue which terminates the branches of the calipers.

Figs. 12 and 13 represent different variations of a method for measuring the size of the glove.

Such calipers consist of two arms which may be similar, and made of metal, wood or other material sufficiently rigid and connected scissor-wise by a pivot $a$ which enables them to assume certain angles.

Said arms consist of a stem $b$ and a handle $b^1$. The stem $b$ is terminated by a knob or swelling $b^2$ making it possible whilst the glove is being measured to stretch the skin by drawing it out with a minimum chance of splitting it. The most general shapes of the knob or tongue are shown in Figs. 1, 6 and 11, given by way of example only, as other shapes may also be adopted.

The knob $b^2$ may be of ordinary shape as shown in Fig. 1, or have the shape shown in Fig. 6, which makes it possible to graduate the intersection of the two handles and thus read off at once the size of the glove to be measured.

As another method of measurement a stem $c$ perpendicular to the handle may also be used, which stem according as to whether a greater or smaller distance from the other branch is left permits reading off the size; or else one of the branches may also be provided with an index $d$ movable before a section $e$ engraved upon the other branch (Fig. 12); or again the shaft may carry a toothed section $f$ engaging a pinion $g$ which carries a hand $h$ movable upon a graduated dial $i$ (Fig. 13). Any other similar method may also be used without departing from the idea of the invention.

In Fig. 6 the curve of the handle is calculated for medium sizes which are mainly used; but the shape may be varied in the case of other sizes.

Said handle moreover may be provided with a pad $b^3$ which permits the tightening of the calipers without tiring the palm of the hand.

The branches $b$ may, if desired, be held at the point of departure by a spring.

The calipers without graduations on themselves may nevertheless supply the particulars of the size either by utilizing ordinary measures or special measures for both with or without index.

The knob or tongue $b^2$ of the stem may be very flat or sometimes even be rounded according to the quality of the skin of the glove when there might be danger of leaving marks of the measurement.

The shape of said knob or tongue is therefore variable according to the description of glove for which the calipers are more particularly intended. The same applies to the handle and the kind of measure.

In the operation of the device the knobs of the stems are inserted in the glove to be measured and are then moved apart, to opposite sides of the glove by manipulating the handles, as will be understood, the size of the glove being indicated upon the scale.

What I claim and desire to secure by Letters Patent is:—

A glove measuring device comprising a pair of members pivotally connected together, intermediate their ends said members having laterally extending portions on their adjacent sides arranged in overlapping relation and through which the pivot extends, said members each forming a relatively straight arm at one end and forming a terminal knob the outer edge of which forms a curve and each member also having a handle extending in the opposite direction from said arm, the said members being further provided with coacting means, including a scale on one of said members to indicate the width of the space between the knobs when the handles are operated, the lateral extensions of said members adapting the two arms to be arranged in parallel relation when the members are closed.

In witness whereof I affix my signature.

PIERRE BARBIER.

Witnesses:
JULIAN KEMBLE SMEDLEY,
JEAN JERMAIN.